United States Patent [19]

Geiger et al.

[11] 4,288,192
[45] Sep. 8, 1981

[54] TOOL-CHANGING MECHANISM

[75] Inventors: Michael Geiger, Starnberg; Manfred Schneider, Grossbottwar; Jörg Lützkendorf, Markgroeningen, all of Fed. Rep. of Germany

[73] Assignee: Friedrich Deckel Aktiengesellschaft, Munich, Fed. Rep. of Germany

[21] Appl. No.: 80,602

[22] Filed: Oct. 1, 1979

[30] Foreign Application Priority Data

Oct. 11, 1978 [DE] Fed. Rep. of Germany ....... 2844319

[51] Int. Cl.³ ............................................. B23Q 3/157
[52] U.S. Cl. .................................... 414/223; 414/225; 414/736; 414/742; 29/568
[58] Field of Search ............... 414/222, 223, 225, 226, 414/735, 736, 738, 742; 29/568

[56] References Cited

U.S. PATENT DOCUMENTS 3,348,298 10/1967 Sedgwick ............................. 29/568
3,587,873 6/1971 Lohneis ............................... 414/736
3,760,958 9/1973 Lohneis ............................... 414/736
4,144,975 3/1979 Tsuboi et al. ....................... 414/736
4,151,918 5/1979 Nakane ............................... 414/736

Primary Examiner—Trygve M. Blix
Assistant Examiner—Terrance L. Siemens
Attorney, Agent, or Firm—Blanchard, Flynn, Thiel, Boutell & Tanis

[57] ABSTRACT

A tool-changing mechanism for machine tools of the kind in which tools can be inserted into a spindle. A tool magazine receives several tools and a double-ended tool-changing arm is provided on each of its two ends with gripping mechanisms. The tool-changing arm is rotatable about an axis of rotation which is parallel to the spindle axis and the tool-changing arm can be moved along the direction of its axis of rotation. The tool-changing arm can also be pivoted, between a working position and a rest position, about a pivot axis which is parallel to its axis of rotation.

18 Claims, 3 Drawing Figures

TOOL-CHANGING MECHANISM

FIELD OF THE INVENTION

The invention relates to a tool-changing mechanism for tool machines of the kind in which tools can be inserted into a spindle and having a tool magazine housing several tools therein and a double-ended tool-changing arm provided at its ends with gripping mechanisms rotatable about an axis of rotation parallel to the spindle axis, which tool-changing arm can be moved along the direction of its axis of rotation.

BACKGROUND OF THE INVENTION

A tool-changing arm of the above-mentioned type, when in its gripping position, simultaneously engages the tool which is provided in the spindle and the tool which is provided in the transition position of the tool magazine, through an axial movement of the changing arm pulls both tools from their mountings, by rotation of the changing arms exchanges the places of the tools, and then inserts same again so that the tool removed from the magazine seats in the spindle and the tool removed from the spindle seats in the space of the magazine freed by the aforementioned pulling. After the changing operation, the changing arm can be rotated from its gripping position into a rest position, in which it does not hinder for example the movement of the machine or the accessibility and visibility of the workpiece. Mainly in the case of arrangements with a movable spindle block and a changing arm mounted at a fixed location on the machine and combined for example with the magazine in one structural unit, it is necessary after the changing operation that the changing arm be swung totally out from the space which the drivable spindle block can occupy, in order not to block spindle block movement. The tool-changing arm can very generally have any desired form for example a form which is bent at a certain angle in its turning plane. In most cases, however, it is constructed as a straight changing arm, which is symmetrical with respect to its axis of rotation.

In the case of a tool machine with a spindle block which can be moved horizontally in the axial direction of the spindle, it is already known to arrange the changing arm laterally next to the spindle block ("Modu-line-Machining Center" of the Firm Kearney & Trecker, USA). To enter its rest position, the changing arm is rotated about its axis of rotation until it is positioned vertically, namely, parallel with respect to the side surface of the spindle block. The support for the rotary and shifting movement of the changing arm is also provided next to the spindle block.

Mainly in the case of spindle blocks with a large front surface, the conventional arrangement results in a large distance between the spindle and the possible place for the rotary support of the changing arm. For reasons of symmetry, the distance of the axis of rotation from the tool magazine must be just as large. All together, a changing arm with a large arm length and a large distance between the spindle block and the magazine is thus obtained. Aside from the undesirable large structural dimensions of such machine the large mass and accelerating forces of the tool-holding changing arm are very disadvantageous because they result in longer changing times, greater vibration and greater wear.

A further disadvantage is also seen in the tools, at a large turning radius of the changing arm, being arranged spaced relatively far from one another in the magazine, or as seen in the known machine, the tools have to be swingable by expensive extra structure in the magazine between a storing position and a transfer position, so that the ends of the changing arm do not come into contact with the tools which are adjacent to the tool to be changed.

The purpose of the invention is to provide an improved mechanism of this general type so that the dimensions of the changing arm, and thus also the distance between the tool magazine and the spindle block, can be kept as small as possible.

This purpose is inventively attained by the tool-changing arm being made pivotable about a further pivot axis parallel to the arm axis of rotation, between a rest position and a working position.

Through this inventive construction it is possible to move the axis of rotation, around which rotates the changing arm during the changing operation, into any desired distance from the spindle for the changing operation. Thus, the changing arm can be kept short and the magazine can be arranged very close to the spindle block. After the changing operation the entire changing arm is again pivoted about the pivot axis away from the spindle, until it assumes a position in which it for example no longer hinders the movements of the spindle block. Aside from the reduced structural dimensions of the machine the short changing arm provides also the advantage that the arm can swing into the row of the tools in the magazine despite relatively close arrangement of the tools in the magazine.

According to a further characteristic of the invention, such swinging movement is a pivoting movement. Under the present invention, the changing arm is then pivoted for example from a vertical rest position parallel to the spindle block sidewall to a horizontal working position. The changing arm thus reaches its gripping position during pivoting from its rest position into its working position, so that the pivoting operation does not need any additional time.

In a preferred exemplary embodiment, the changing arm is straight, in a conventional manner, and carries out a 180° rotation during the tool change, wherein the angle of pivoting is for example 90°. The pivot axis is arranged between the axis of rotation and one of the two ends of the changing arm. The arm part which is shorter with respect to the pivot axis is swung during the pivoting movement into the working position toward the tool magazine. This arrangement gives this shorter arm part a turning radius which is again shorter compared with the arm length defined by the axis of rotation, so that the tools can be arranged correspondingly closely in the magazine.

A structural development of the invention provides that the axis of rotation of the tool-changing arm is supported rotatably in a bearing housing, which is pivotable in turn about a pivot axis which is parallel to the axis of rotation and is supported on the machine movably in the direction of said pivot axis. Drives for the rotary movement of the changing arm, the pivoting movement and the shifting movement of the bearing housing are provided. In order to pivot the changing arm from its rest position into the working position, the bearing housing is pivoted and in pivoting thereby takes along with it the axis of rotation. The changing arm remains fixed relative to the bearing housing, so that it also pivots with the bearing housing and thus reaches its gripping position directly, as will be described in more detail in the following detailed description.

Further characteristics and advantages of the invention will be apparent to persons acquainted with apparatus of this general type upon reading the following specification and inspecting the accompanying drawings. One exemplary embodiment is illustrated in the drawings and is described in more detail hereinafter.

DETAILED DESCRIPTION

Figure 1:
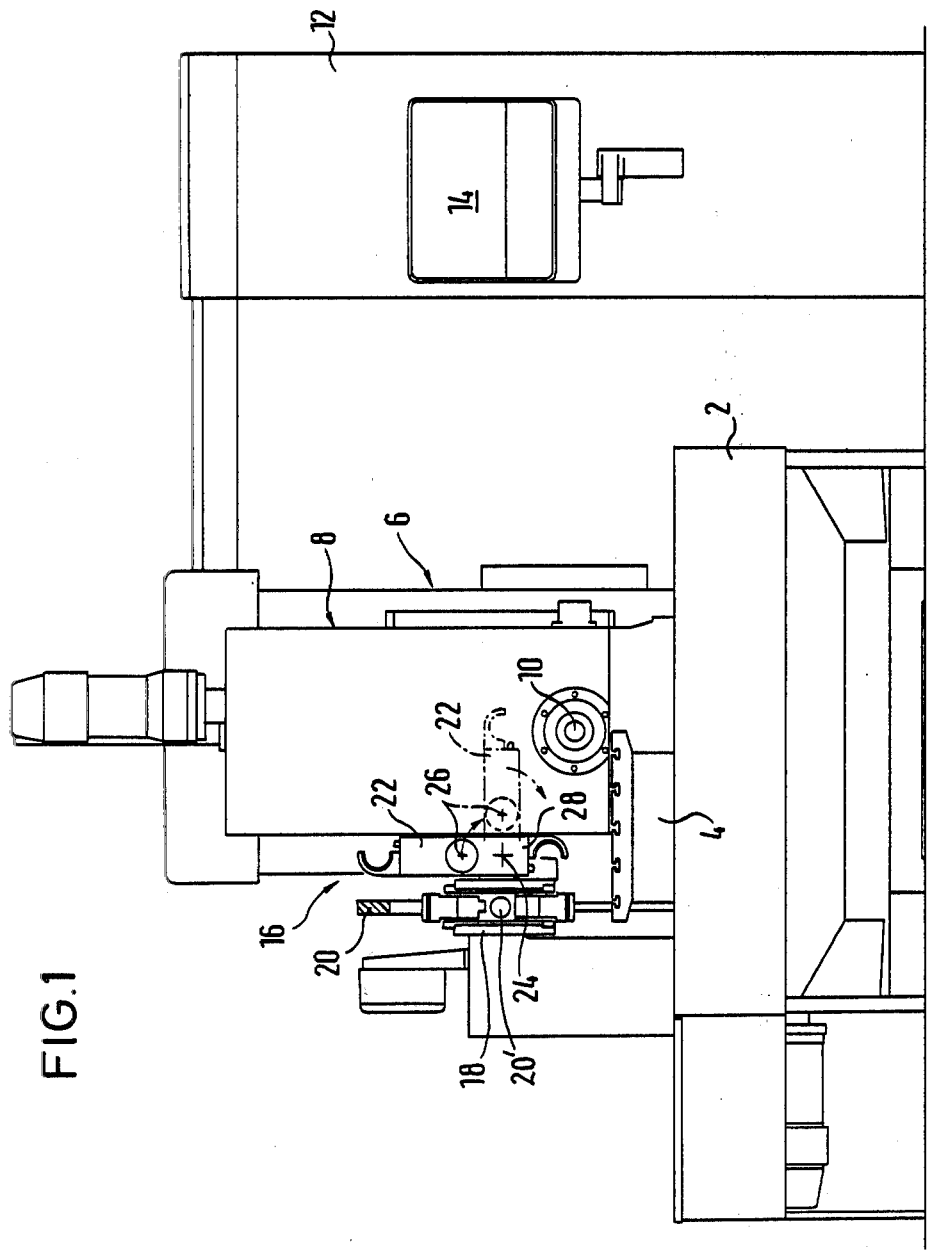
FIG. 1 is a front view of a horizontal milling and boring machine with a changing arm which is arranged next to the transversely movable spindle block.

The machine which is illustrated in FIG. 1 comprises a machine bed 2 with a longitudinally movable workpiece table 4, a horizontal carriage 6 which is supported for transverse movement on the bed 2, namely perpendicular to the plane of the paper, and a spindle block 8 which can be moved vertically on said carriage and which contains the working spindle 10 and the spindle drive, which is not illustrated. Next to the machine stands a control cabinet 12 for the electrical supply and the control of the machine, and which includes an operating and indicating desk 14.

At the left (FIG. 1) side of the horizontal carriage 6 there is arranged a tool-changing mechanism 16 fixedly supported on the bed 2. It includes a chain magazine 18 with tools 20' and the tool-changing arm 22. The chain magazine comprises, in a conventional manner not shown in detail, an endless chain with mountings for the tools, which chain is guided over two turnaround pulleys, or sprockets. By moving the chain, the next tool to be inserted into the spindle 10 can be moved into the position 20' from which it can be removed from the magazine by the changing arm 22.

As seen in FIG. 1, the changing arm 22 in its rest position (shown in solid lines) is totally outside of the path of movement of the horizontal carriage 6, so as not to interfere with transverse movement of the carriage 6. For the changing operation, arm 22 is pivoted about the pivot axis 24 through 90° into its working position (shown in dash-dotted lines for the rightward end of arm 22 in FIG. 1). This pivotally displaces the axis 26 of arm rotation to a position near the spindle 10, so that the changing arm 22 can be short. The chain magazine 18 can then also be arranged correspondingly close on the horizontal carriage 6.

As can furthermore be taken from FIG. 1, the turning radius of the lower part 28 of the changing arm 22, which arm part 28 is the shorter one with respect to the pivot axis 24, is very small so that it can be swung in without danger of a collision between closely arranged tools of the chain magazine 18. The working position of the changing arm 22, shown in dash-dotted lines in FIG. 1, is also its gripping position. For the changing operation, the spindle block 8 must of course be raised from its FIG. 1 position to the level of the changing arm 22, more precisely the height of the pivot axis 24, this raised position not being shown to avoid a confusion of lines within FIG. 1.

The actual changing operation occurs by the changing arm 22 conventionally gripping the tool then in the spindle 10 and the tool then in the transfer position 20' of the magazine 18, removing these tools from their mountings by movement of the changing arm 22 along the direction of the axis 26 of rotation, causing these tools to exchange places by rotation of arm 22 about its axis 26 of rotation through 180°, and again inserting the exchanged tools through a movement of the arm 22 in the opposite direction along its axis 26 of rotation. Then the changing arm 22 is pivoted back into its solid line rest position, about pivot axis 24.

Figure 2:
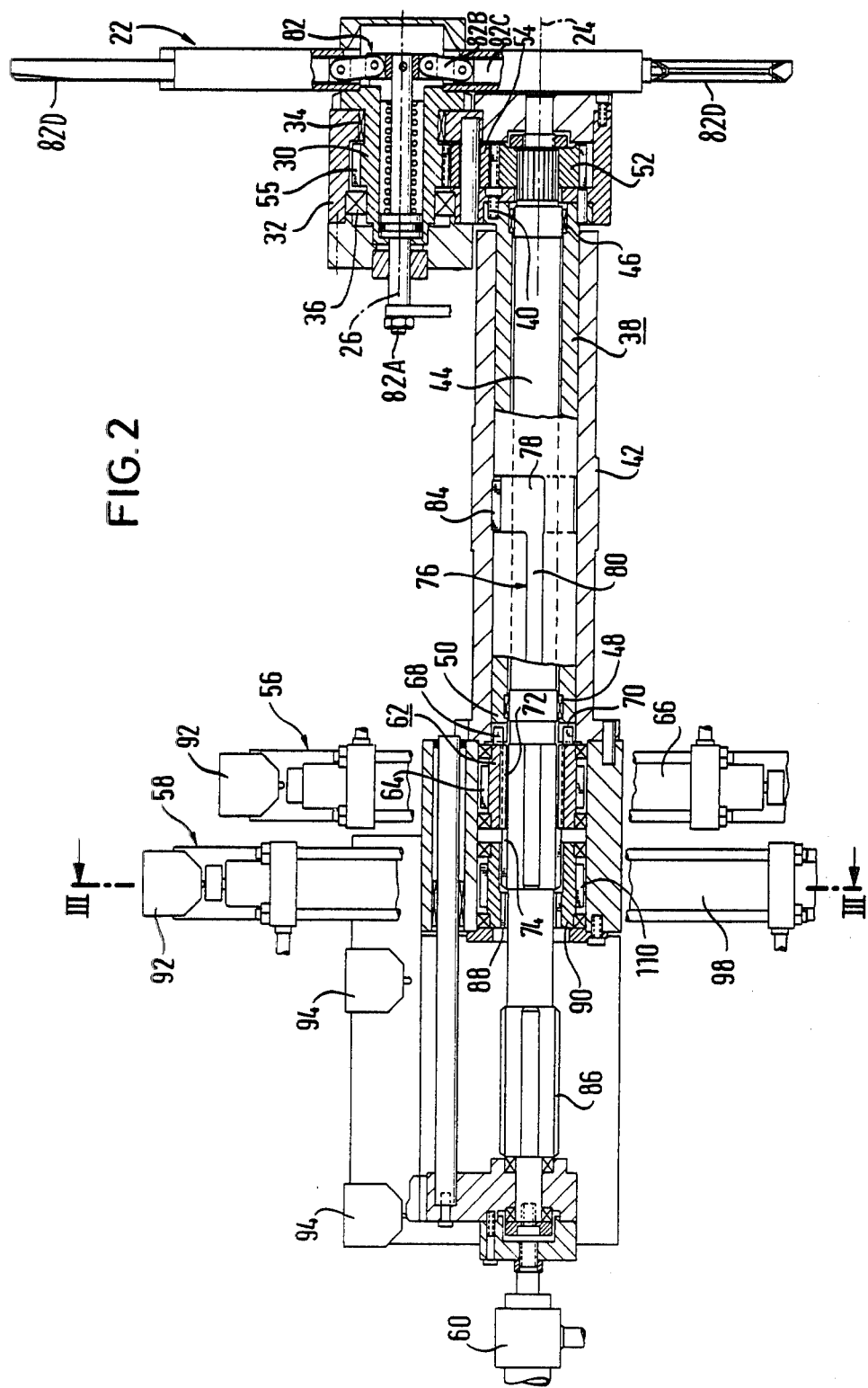
FIG. 2 is a longitudinal cross-sectional view of a changing arm according to FIG. 1.

FIG. 2 shows in detail the changing arm 22 and its support and drive mechanism. As seen in FIG. 2, the changing arm 22 is fixedly connected to a hollow shaft 30, which is supported rotatably through bearings 34, 36 in a bearing housing 32 and which defines the pivot axis 24 for the changing arm 22. The bearing housing 32 itself is fixedly connected to a hollow shaft 38 through screws 40. The shaft 38 is supported in a carrier housing 42 rotatably and longitudinally slidably by a sleeve bearing not shown in detail. The carrier housing 42 is fixedly supported on the machine. A rotation of the hollow shaft 38 results in a pivoting of the bearing housing 32.

A drive shaft 44 is rotatably supported and longitudinally fixed within the hollow shaft 38 by roller bearings 46, 48. Said drive shaft 44 projects past the end 50 of the hollow shaft 38, which end 50 faces away from the changing arm 22. A gear 52 is fastened on the opposite end of the drive shaft 44. The gear 52 is connected through an intermediate pinion 54, supported in the bearing housing 32, to a tooth system 55 constructed on the outside of the hollow shaft 30. A rotation of the drive shaft 44 thus leads to a rotation of the changing arm 22 with respect to the bearing housing 32.

The rotary movement of the hollow shaft 38 is caused by rack-and-pinion drives 56 and 58, rotary movement of the drive shaft 44 being either by the rack-and-pinion drive 56 or the rack-and-pinion drive 58, depending on whether the drive shaft 44 is in its retracted or extended position, as described in more detail hereinafter. Longitudinal movement of the drive shaft 44, correspondingly longitudinally moves therewith the hollow shaft 38 and bearing housing 32 and changing arm 22, and is caused by a suitable longitudinal movement drive 60, schematically shown in FIG. 2.

Further structural details of the apparatus will be discussed hereinafter in connection with the description of the operation. FIG. 2 illustrates the tool-changing mechanism in its rest position, in which the bearing housing 32 and the changing arm 22 are positioned vertically next to the spindle block 8 (see FIG. 1 solid-line position). In order to pivot the changing arm 22 into its working position or gripping position, the rack-and-pinion drive 56 is operated. This rotates a gear 62 which is supported in the carrier housing 42, or by a structural part connected fixedly therewith, the gear 62 having an external tooth system 64 which engages a rack 66 and therewith forming the pinion and rack of the drive 56. The gear 62 has furthermore an axial clutch tooth system 68, which engages axial clutch teeth 70 fixed to the end 50 of the hollow shaft 38. At the same time the gear 62 engages through an internal tooth system 72 into an external tooth system 74 of the drive shaft 44, so that same also rotates therewith. Thus, by operating the rack-and-pinion drive 56, the bearing housing 32 and the changing arm 22 are swung in the same direction.

The hollow shaft 38 has on its outside a channel 76 which has a section 78 which extends in the peripheral direction and a section 80 which follows the section 78 and extends in the longitudinal direction. During the pivoting of the hollow shaft 38, slider tooth 84 fixed to the inside of the carrier housing 42 slides in the section 78, until it is in alignment with the section 80.

In the meantime, the changing arm 22 has gripped the tools of the spindle 10 and of the magazine 18 and has secured same through a tool gripping mechanism generally indicated at 82, which mechanism 82 is conventional and here includes a shaft 82A axially shiftable to shift toggle links 82B and pins 82C to cause tool engaging fingers 82D to grip or release a tool in a conventional manner.

The drive shaft 44 is moved to the right in FIG. 2 by means of the longitudinal movement drive 60. Drive shaft 44 takes along the hollow shaft 38. During this movement, the axial clutches 68, 70 disengage. A rotation of the hollow shaft 38 is prevented by the slider tooth 84, which engages the section 80 of the channel 76. A rotation of the drive shaft 44, for example under the influence of unevenly heavy tools on opposite ends of the changing arm 22, is prevented by the internal tooth system 72 of the gear 62 remaining in engagement with the external tooth system 74 of the drive shaft 44, until a rear external tooth system 86 of the drive shaft 44 engages an internal tooth system 88 of a gear 90, which is part of the rack-and-pinion drive 58.

When the drive shaft 44 is fully extended, the rack-and-pinion 58 is operated, which through the gear 90, the drive shaft 44 and the gears 52, 54, 55 rotates the changing arm 22 about axis 26 to exchange the tools. Then the drive shaft 44 is again retracted (which causes the exchanged tools 20 to be respectively inserted into the spindle 10 and magazine 18), the gripping mechanism 82 is released and the changing arm 22 is pivoted by operating the rack-and-pinion drive 56 into its rest position. It is possible, prior to pivoting the changing arm 22 into its rest position, to first move same forwardly again and rotate same back into its initial position. However, it can also be pivoted, in the position which it assumes after the changing operation, into the rest position. The rotary movement of the changing arm 22 occurs in this case then alternatively in clockwise or counterclockwise direction.

The rack-and-pinion drives 56 and 58 are operated, for example, through hydraulic cylinders and are controlled by electric limit switches 92. Further limit switches 94 limit the path of the movement drive 60.

Figure 3:
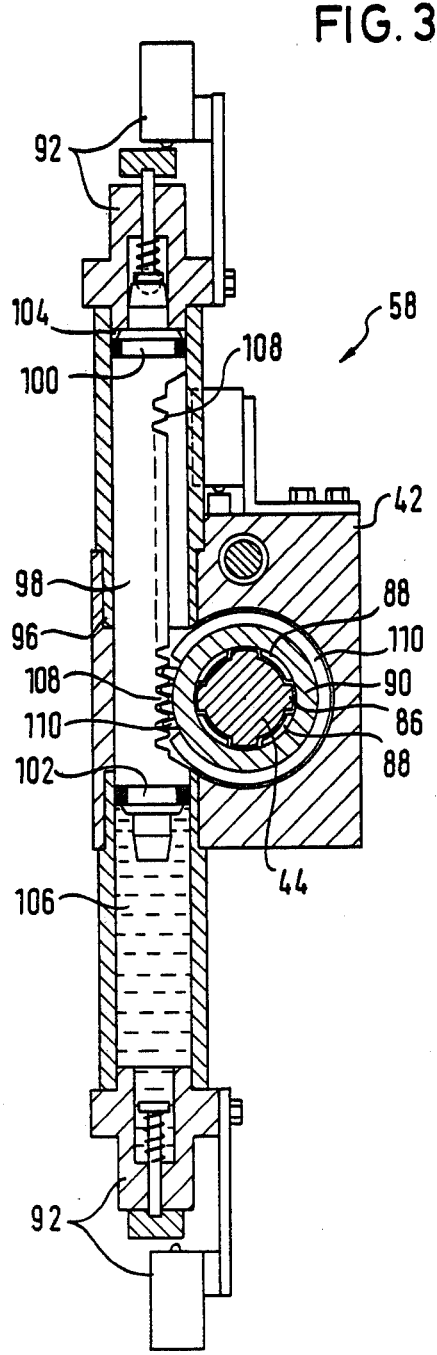
FIG. 3 is a cross-sectional view substantially as taken on the line III—III of FIG. 2.

FIG. 3 shows a cross-sectional view, corresponding with the line III—III of FIG. 2, of the rack-and-pinion drive 58. Drive 58 comprises a housing 96, in which the rack 98 is supported for longitudinal movement. Pistons 100, 102 are arranged at both ends of the rack, which pistons are movable in associated cylinders 104, 106. The path of the rack 98 and thus the angle of rotation of the drive shaft 44 is fixed exactly by limit switches 92. The tooth system 108 of the rack engages the external tooth system 110 of the gear 90 and rotates same. The internal tooth system 88 of the gear 90 engages the external tooth system 86 of the drive shaft 44, as already described.

The rack-and-pinion drive 56 is similar in structure and is therefore not described in detail.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A tool-changing mechanism for tool machines of the kind having a working spindle which receives a tool, said tool-changing mechanism including a tool magazine which contains several tools and a double-arm tool-changing arm which has on its two ends respective gripping mechanisms, said tool-changing arm being rotatable about an axis of rotation parallel to the spindle axis and being movable along the direction of said axis of rotation, said arm having a gripping position in which it simultaneously grips a tool which is in the magazine and a tool which is in the working spindle and exchanges these tools by rotation about said axis of rotation, said arm being pivotable about a pivot axis between a working position and a rest position outside of the spindle area, said pivot axis being parallel to said axis of rotation and to said spindle axis, wherein the improvement is comprised by means locating said pivot axis on said machine and with respect to said axis of rotation for pivoting of said tool-changing arm about its pivot axis from its said rest position into its said gripping position directly and thus without need for rotation about its said axis of rotation, and for later pivoting of said tool-changing arm back to its said rest position.

2. A tool-changing mechanism according to claim 1, wherein the tool-changing arm is straight and carries out a 180° rotation, and wherein the angle of pivoting is approximately 90°.

3. A tool-changing mechanism according to claim 2, wherein said pivot axis intersects the tool-changing arm between said axis of rotation and one end of the changing arm.

4. A tool-changing mechansim according to claim 3, wherein the part of the double-arm tool-changing arm which is shorter as measured from said pivot axis is the part of said changing arm which during said pivoting movement is pivoted toward the tool magazine.

5. A tool-changing mechanism according to claim 1 including a hollow shaft supported rotatably and movably in a carrier housing connected fixedly to the machine, a bearing housing fixed on said hollow shaft and in turn carrying the axis of rotation of the rotatable tool-changing arm, a drive shaft supported rotatably but axially nonmovably within the hollow shaft, said drive shaft being drivingly connected through a gear drive arranged in the bearing housing to the axis of rotation of the tool-changing arm, a rotary drive fixed upon the machine at the rearward end of the hollow shaft, which end faces away from the changing arm, for rotating said hollow shaft, a further rotary drive fixed upon the machine and engaging a part of the drive shaft, which part projects beyond the rearward end of the hollow shaft, and a moving drive engaging the rearward end of the drive shaft, which end faces away from the changing arm, for longitudinally moving said changing arm.

6. A tool-changing mechanism according to claim 5, wherein said rotary drive for the hollow shaft includes a longitudinally movable rack, which drives a gear which is concentric with the hollow shaft and is supported in the carrier housing, wherein the latter gear has axial clutch teeth which, when the changing arm is retracted, engage with axial clutch teeth which are constructed on the rearward end of the hollow shaft and the latter gear has an internal tooth system which engages a first external tooth system, which is constructed on the drive shaft and permits a longitudinal movement of the drive shaft relative to the latter gear.

7. A tool-changing mechanism according to claim 6, wherein the rotary drive for the drive shaft includes a longitudinally movable rack, which drives a further gear which is concentric with respect to the drive shaft and is supported in the carrier housing, wherein the further gear has an internal tooth system which, when the changing arm is retracted, engages said first external tooth system, and which when the changing arm is extended engages a second external tooth system of the drive shaft, which second external tooth system reaches into the area of the further gear, said second external tooth system being separated from the first external tooth system by a nontoothed area.

8. A tool-changing mechanism according to claim 7, wherein the areas of the external tooth systems of the drive shaft are arranged such that during a longitudinal movement of the drive shaft into a centered position both external tooth systems are in engagement with their associated gears.

9. A tool-changing mechanism according to claim 5, wherein the hollow shaft is provided with means for locking it against rotation in the position which corresponds with the working position of the bearing housing.

10. A tool-changing mechanism according to claim 9, wherein the means for locking the hollow shaft against rotation includes a channel constructed on the outer surface of the hollow shaft, into which channel engages a slider tooth which is arranged on the inner surface of the carrier housing.

11. A tool-changing mechanism according to claim 10, wherein the channel includes a section which extends in the peripheral direction and an adjacent section which permits a rotation of the hollow shaft, which adjacent section permits a longitudinal movement of the hollow shaft and prevents rotation thereof.

12. A tool-changing mechanism according to claim 1, for a tool machine with a movable spindle block, wherein the pivot axis of the tool-changing arm is fixed to the machine outside of the space which can be occupied by the spindle block and the tool-changing arm is pivotable between its working position and a rest position which is completely outside of the space which can be occupied by the spindle block.

13. A tool-changing mechanism according to claim 1, in which said axis of rotation of said tool-changing arm is carried at an eccentric location on an eccentric member in turn pivoted about said pivot axis, said pivot axis being spaced substantially between said tool magazine and spindle axis, and wherein the improvement further comprises a said rest position in which said pivot axis is spaced between said rotational axis and one tool gripping end of said arm, said pivot axis further being disposed substantially on a line between the location of tools to be interchanged in said magazine and spindle, said eccentric means being pivotable about said pivot axis to bring all of said pivot axis, rotational axis and the tool engaging ends of said arm substantially onto said line connecting the location of the tools to be interchanged on the magazine and spindle and thereby to directly pivot said arm from its rest position to its gripping position.

14. A tool-changing mechanism for tool machines of the kind in which tools can be inserted into a spindle, said tool-changing mechanism having a tool magazine which receives several tools and a double-ended tool-changing arm, said arm being provided on each of its two ends with gripping mechanisms, said tool-changing arm being rotatable about an axis of rotation parallel to the spindle axis, said tool-changing arm being movable along the direction of its axis of rotation, wherein the improvement is comprised in that said tool-changing arm is pivotable between a working position and a rest position, about a pivot axis parallel to said axis of rotation and to said spindle axis, said axis of rotation of said arm being supported in a bearing housing pivotable about said pivot axis and secured at the end of a hollow shaft for the support of said changing arm, said hollow shaft extending along said pivot axis, said hollow shaft being supported rotatably and movably in a carrier housing fixed to the machine, a drive shaft supported rotatably within said hollow shaft and arranged for rotatably driving said tool-changing arm about said axis of rotation, a rotary drive for rotation of said hollow shaft and a further rotary drive engaging a part of said drive shaft for rotating same, wherein the rotary drive for the hollow shaft includes a longitudinally movable rack, which drives a gear which is concentric with the hollow shaft and is supported in the carrier housing, wherein the latter gear has axial clutch teeth which, when the changing arm is retracted, engage with axial clutch teeth which are constructed on the rearward end of the hollow shaft and the latter gear has an internal tooth system which engages a first external tooth system which is constructed on the drive shaft.

15. A tool-changing mechanism according to claim 14, wherein the rotary drive for the drive shaft includes a longitudinally movable rack, which drives a gear which is concentric with respect to the drive shaft and is supported in the carrier housing, wherein the latter gear has an internal tooth system which, when the changing arm is extended, engages a second external tooth system of the drive shaft, which second external tooth system ultimately drives said changing arm.

16. A tool-changing mechanism according to claim 15, wherein the areas of the external tooth systems of the drive shaft are arranged such that during a longitudinal movement of the drive shaft into a centered position both external tooth systems are in engagement with their associated gears.

17. A tool-changing mechanism for tool machines of the kind in which tools can be inserted into a spindle, said tool-changing mechanism having a tool magazine which receives several tools and a double-ended tool-changing arm, said arm being provided on each of its two ends with gripping mechanisms, said tool-changing arm being rotatable about an axis of rotation parallel to the spindle axis, said tool-changing arm being movable along the direction of its axis of rotation, wherein the improvement is comprised in that said tool-changing arm is pivotable between a working position and a rest position, about a pivot axis parallel to said axis of rotation and to said spindle axis, said axis of rotation of said arm being supported in a bearing housing pivotable about said pivot axis and secured at the end of a hollow shaft for the support of said changing arm, said hollow shaft extending along said pivot axis, said hollow shaft being surrounded rotatably and movably in a carrier housing fixed to the machine, a drive shaft supported rotatably within said hollow shaft and arranged for rotatably driving said tool-changing arm about said axis of rotation, a rotary drive for rotation of said hollow shaft and a further rotary drive engaging a part of said drive shaft for rotating same, wherein said hollow shaft is provided with means for locking it against rotation in a position corresponding with said working position, and wherein the means for locking the hollow shaft against rotation includes a channel which is constructed on the outer surface of the hollow shaft, into which channel engages a slider tooth which is arranged on the inner surface of the carrier housing.

18. A tool-changing mechanism according to claim 17, wherein the channel includes a section which extends in peripheral direction and permits a rotation of the hollow shaft and a next following section which extends in the longitudinal direction, which permits a longitudinal movement of the hollow shaft and prevents rotation thereof.

* * * * *